United States Patent
Reich et al.

[11] 3,729,176
[45] Apr. 24, 1973

[54] APPARATUS FOR AIDING THE FLOW OF PARTICULATE MATERIALS THROUGH A HOPPER

[75] Inventors: Hanan Reich, Lakewood; Seymour Wolf, Saddle Brook, both of N.J.

[73] Assignee: Nabisco, Inc., New York, N.Y.

[22] Filed: Apr. 26, 1971

[21] Appl. No.: 137,452

[52] U.S. Cl. .................. 259/4, 34/57 R, 222/195, 259/180
[51] Int. Cl. .............................. B01f 15/02
[58] Field of Search ............... 34/57 A, 57 R, 10; 263/21 A; 259/4, 180, 36, DIG. 17; 222/195; 302/45

[56] References Cited

UNITED STATES PATENTS

| | | | |
|---|---|---|---|
| 3,249,263 | 5/1966 | Howard | 222/195 X |
| 3,259,998 | 7/1966 | Leclere et al. | 34/57 A |
| 2,058,218 | 10/1936 | Duccini et al. | 34/57 R X |

FOREIGN PATENTS OR APPLICATIONS

| | | | |
|---|---|---|---|
| 626,209 | 11/1967 | Netherlands | 222/195 |
| 91,468 | 2/1958 | Norway | 222/195 |

Primary Examiner—William F. O'Dea
Assistant Examiner—William C. Anderson
Attorney—Gerald Durstewitz and I. Allen Strombeck

[57] ABSTRACT

Apparatus for fluidizing particulate materials flowing through a hopper comprising a helical like tubular manifold for low pressure air shaped to conform to the inner walls of the hopper and having air nozzles throughout its length which are directed horizontally in the upper turns of the manifold and downwardly in the lower turns.

3 Claims, 5 Drawing Figures

Patented April 24, 1973

INVENTORS
HANAN REICH
SEYMOUR WOLF

BY

PATENT AGENT

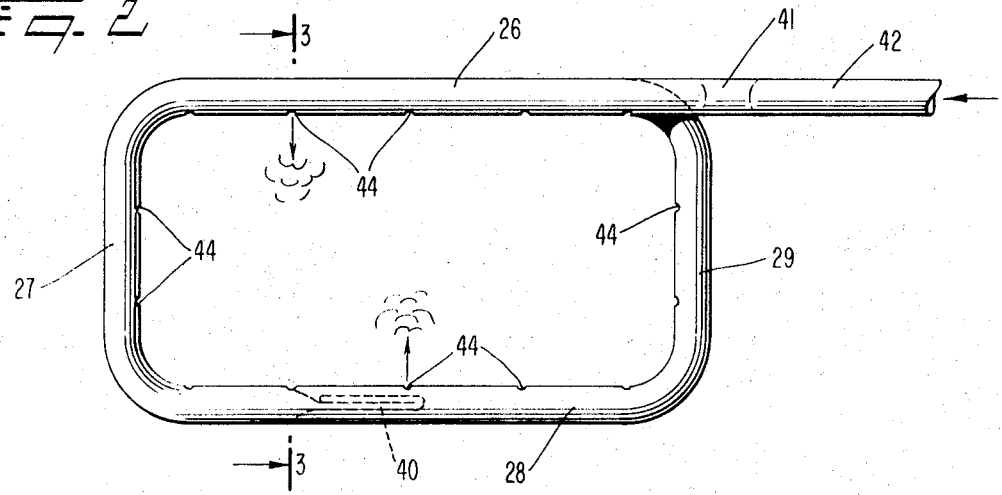
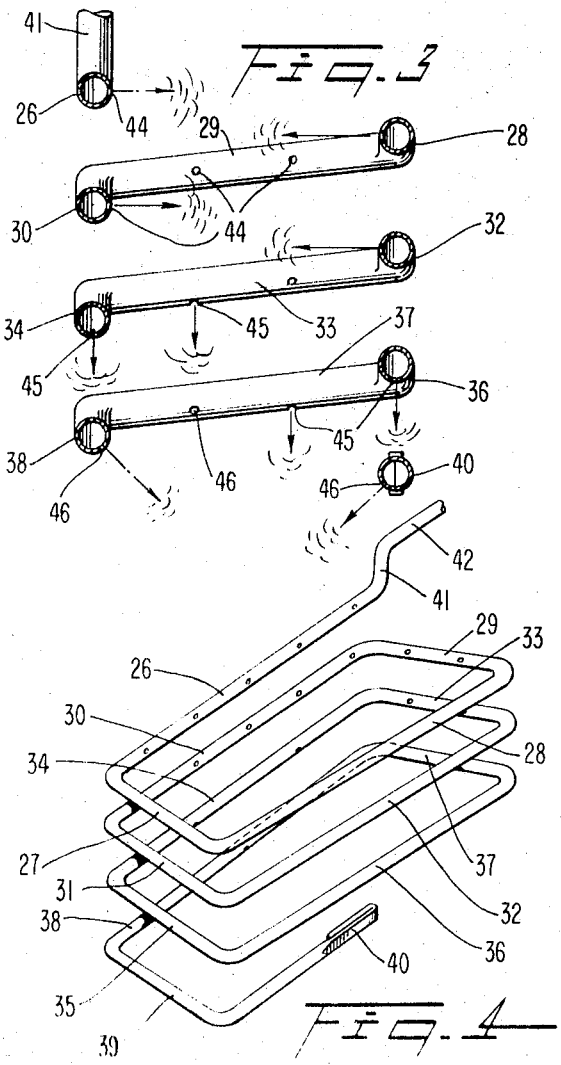
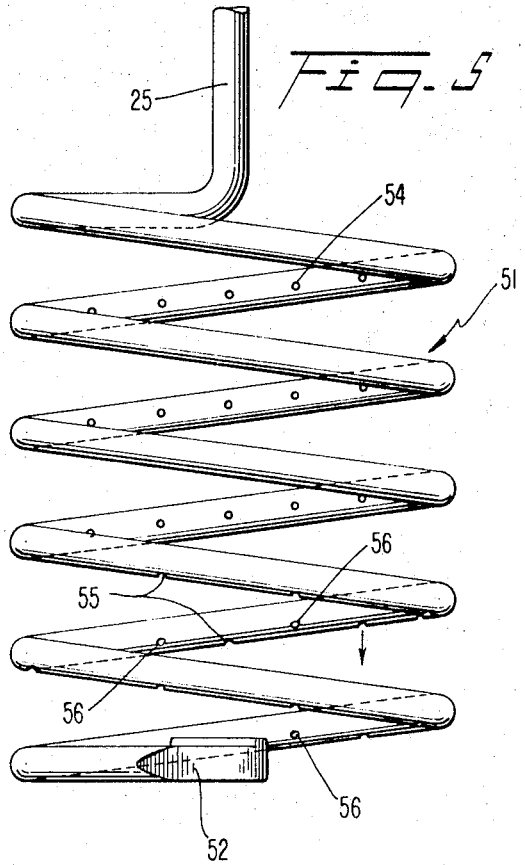
INVENTORS
HANAN REICH
SEYMOUR WOLF

APPARATUS FOR AIDING THE FLOW OF PARTICULATE MATERIALS THROUGH A HOPPER

BACKGROUND OF THE INVENTION

The present invention relates to apparatus for aiding the flow of particulate materials, and, more particularly to such apparatus wherein a flow of gaseous medium under pressure is utilized to fluidize the particulate material.

In the food industry, extruders are commonly utilized in the manufacture of snack foods and breakfast cereals. A common practice in the production of such extruded products is to combine the dry ingredients with sufficient water to form a dough. The dough is then fed, in a ribbon, into the hopper of the extruder, and is drawn down to the extruding screw and is forced through a die. During the extrusion process, heat is generated which vaporizes the water in the dough causing the extruded product to expand producing a low density fluffy product.

More recently snack and cereal products have been formed by feeding coarsely ground corn or rice meal directly into the extruder. By changing the die and the pitch of the extruding screw, sufficient pressure is generated in the extruder to vaporize the moisture content of the meal so as to achieve the desired expansion.

The earlier extruders, sometimes with relatively minor modifications, were frequently used for processing the dry cereal meals. These new products could therefore be produced without substantial expenditure for capital equipment.

The use of these converted extruders, however, has been limited to the processing of coarse cereal meals which had been sifted to remove substantially all fines and which had a low moisture content. Cereal meals which did not meet these standards would, when fed into the extruder's hopper, cohere and bridge over the passageway to the screw at the bottom of the hopper and thus interrupt the operation of the extruder. The meals which do meet the size and moisture standards are higher priced (by virtue of additional processing) and are not available from all meal suppliers. Other materials which are desirable for use in snack foods, such as potato flakes; soy meal; coconut flakes; flours; and mixtures of these materials with each other or with meals, could not be processed with these extruders because such materials would not consistently flow through the hopper of the extruder.

It is well known that powdered materials may be given fluid flow characteristics by introducing pressurized air into the powdered material. In the past, when it was desired to pneumatically convey powdered materials, a system was constructed for this purpose and the means for introducing air into the powder was built into the material handling elements of the system. One such system is shown in U.S. Pat. No. 2,336,017 wherein powdered material within a powder accumulating vessel is fluidized by means of three perforated tubes extending horizontally from a rotating vertical air inlet pipe. The pipe is driven by a motor and is connected by means of a rotary coupling to a supply of pressurized air. It is obvious that such a device could not be economically utilized to convert a hopper designed to handle only materials with excellent flow characteristics into one which will handle materials with poor flow characteristics.

SUMMARY OF THE INVENTION

It is an object of the present invention to provide apparatus for aiding the flow of particulate materials.

Another object is to provide apparatus which may be added to existing equipment to enable that equipment to handle a wider range of materials.

Another object is to provide such apparatus which is inexpensive to manufacture and install.

The foregoing objects are accomplished by providing apparatus for fluidizing and conveying particulate materials through a passageway having an inlet and an outlet comprising a manifold for fluid medium under pressure encircling the passageway and provided with nozzle means directing the pressurized fluid medium toward the center of the passageway along a line extending around the passageway and toward the outlet in a spiral manner.

BRIEF DESCRIPTION OF THE DRAWINGS

A preferred embodiment of the invention has been chosen for purposes of illustration and description, and is shown in the accompanying drawings, forming a part of the specification, wherein:

FIG. 2 is a top plan view of the apparatus according to the invention.

FIG. 3 is a sectional view taken along the line 3—3 on FIG. 2.

FIG. 4 is an isometric view of the apparatus shown in FIGS. 1 to 3.

FIG. 5 is an elevational view of modified apparatus according to the present invention for use with a cylindrical shaped hopper.

DESCRIPTION OF THE PREFERRED EMBODIMENT

Figure 1:
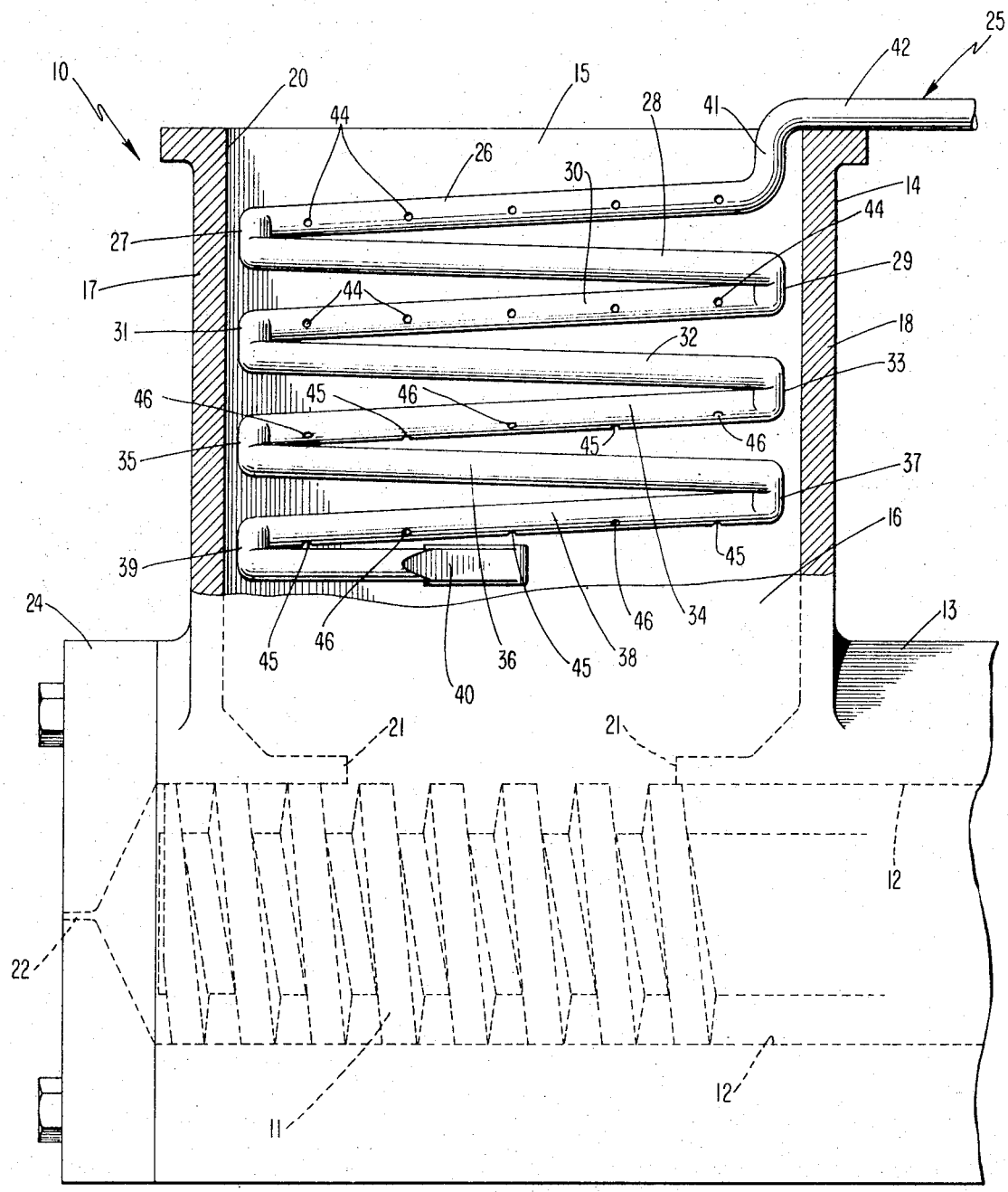
FIG. 1 is an elevational view partly in section of a portion of an extruder showing apparatus according to the present invention positioned in the hopper thereof.

Referring now to the drawings in detail, there is shown a portion of a conventional extruder 10 having a screw 11 positioned within a bore 12 in cylindrical body 13 and having a hopper 14 extending upwardly from the body 12. The body 12 and the hopper 14 are portions of a single casting and each is formed with thick walls. The hopper 14 is rectangular having a pair of vertical side walls 15 and 16 and a pair of vertical end walls 17 and 18. The hopper has an open upper end or inlet 20 and an outlet 21 communicating with the screw 11. The screw 11 when rotatably driven receives material to be extruded from the hopper 14 and forces this material through a die opening 22 in a die plate 24 secured to the end of the body 13.

With reference to FIGS. 1–4 the apparatus according to the present invention comprises a tube 25 which has been bent into a helix like configuration conforming in cross section to the walls of the hopper. The helix like configuration includes long straight sections 26, 28, 30, 32, 34, 36, and 38 along the side walls 15 and 16 and short straight sections 27, 29, 31, 33, 35, 37, and 39 which lie along the end walls 17 and 18 and serially connect the long sections. Each of the sections 26 to 39 slope downwardly and the lower end 40 of the tube 25 is bent back upon itself and crimped to provide a fluid tight seal. At the upper end of the helix-like configuration the tube is formed with a short vertical section 41 and a horizontal section 42 which engages the upper edge of the wall 18 to support the apparatus. The tube section 42 is connected to a source of pressurized gas, for example air having a pressure of 5 pounds per square inch gauge.

The sections 26 through 32 are provided with horizontally directed nozzles 44 which are positioned in a line along the inwardly facing surface of the sections.

The sections 33 to 40 are provided with alternately positioned nozzles 45 and 46 spaced along their length. The nozzles 45 face vertically downwardly while the nozzles 46 face inwardly and downwardly at 45 degrees to the vertical.

It has been found that apparatus just described, when placed in the hopper of an extruder, successfully induces materials having poor flow characteristics to readily flow through the hopper. Materials which have been successfully handled include: corn and rice meals with a high proportion of fines; corn meal with a high moisture content; potato flakes; and soy meal.

FIG. 5 discloses a modification of the apparatus of FIG. 1 to 4 for use in a cylindrical hopper. In this embodiment a tube 50 is bent into a cylindrical helix 51 and crimped at its lower end 52. The upper turns of the helix are provided with a line of spaced nozzles 54 which are directed horizontally toward the center of the helix. The lower turns of the helix are provided with nozzles 55 and 56 which are alternately positioned along their length. The nozzles 55 are directed vertically downwardly and the nozzles 56 are directed inwardly and downwardly at a 48° angle to the vertical. In this embodiment, the helix 51 is sized to fit closely within a cylindrical hopper and the upper end of the tube 25 is connected to a pressurized gas supply to fluidize pulverulent materials fed into the hopper.

It can be seen from the foregoing, that the present invention provides inexpensive and easily installed apparatus for aiding the flow of particulate materials which is added to existing equipment to increase the range of materials that the equipment can handle.

We claim:

1. Apparatus for fluidizing pluverlent flowing by gravity through a vertically oriented hopper having an upper inlet into which the materials are fed by gravity and a lower outlet, said apparatus comprising an elongate tubular manifold arranged in a generally helical configuration and positioned vertically within said hopper to define a passageway for the material between the inlet and outlet of the hopper, and a plurality of nozzles spaced along the length of said manifold for directing fluid medium under pressure into the material flowing through said passageway, said manifold having upper and lower turns, said nozzles in said upper turns being directed horizontally, and said nozzles in said lower turns being directed downwardly.

2. Apparatus according to claim 1 wherein a portion of said nozzles in said lower turns are directed vertically downward and a portion are directed inwardly and downwardly.

3. Apparatus according to claim 2 wherein said nozzles in said lower turns are alternately directed vertically downwardly and inwardly at an angle to the vertical.

* * * * *